United States Patent Office 3,426,611
Patented Feb. 11, 1969

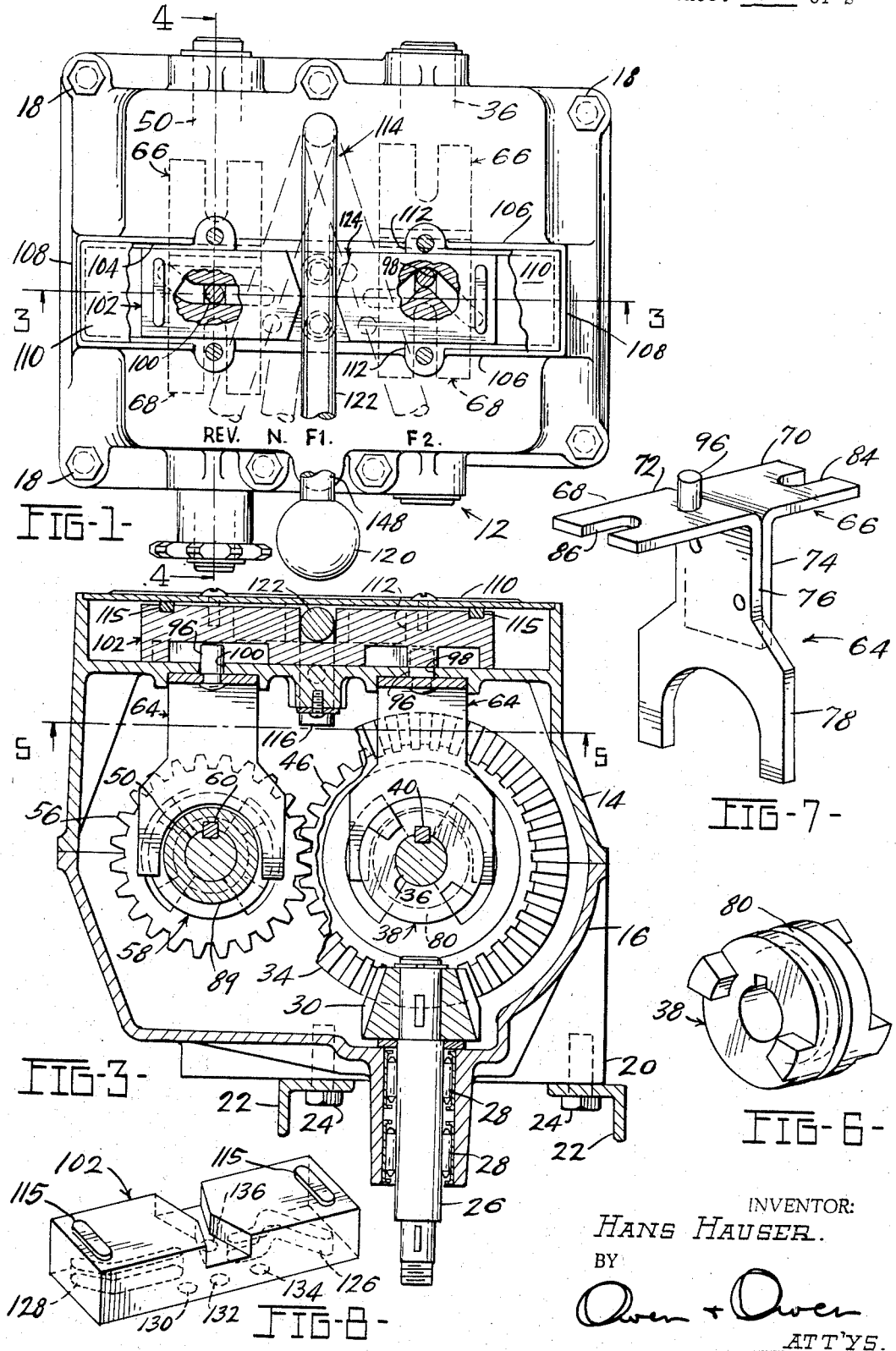

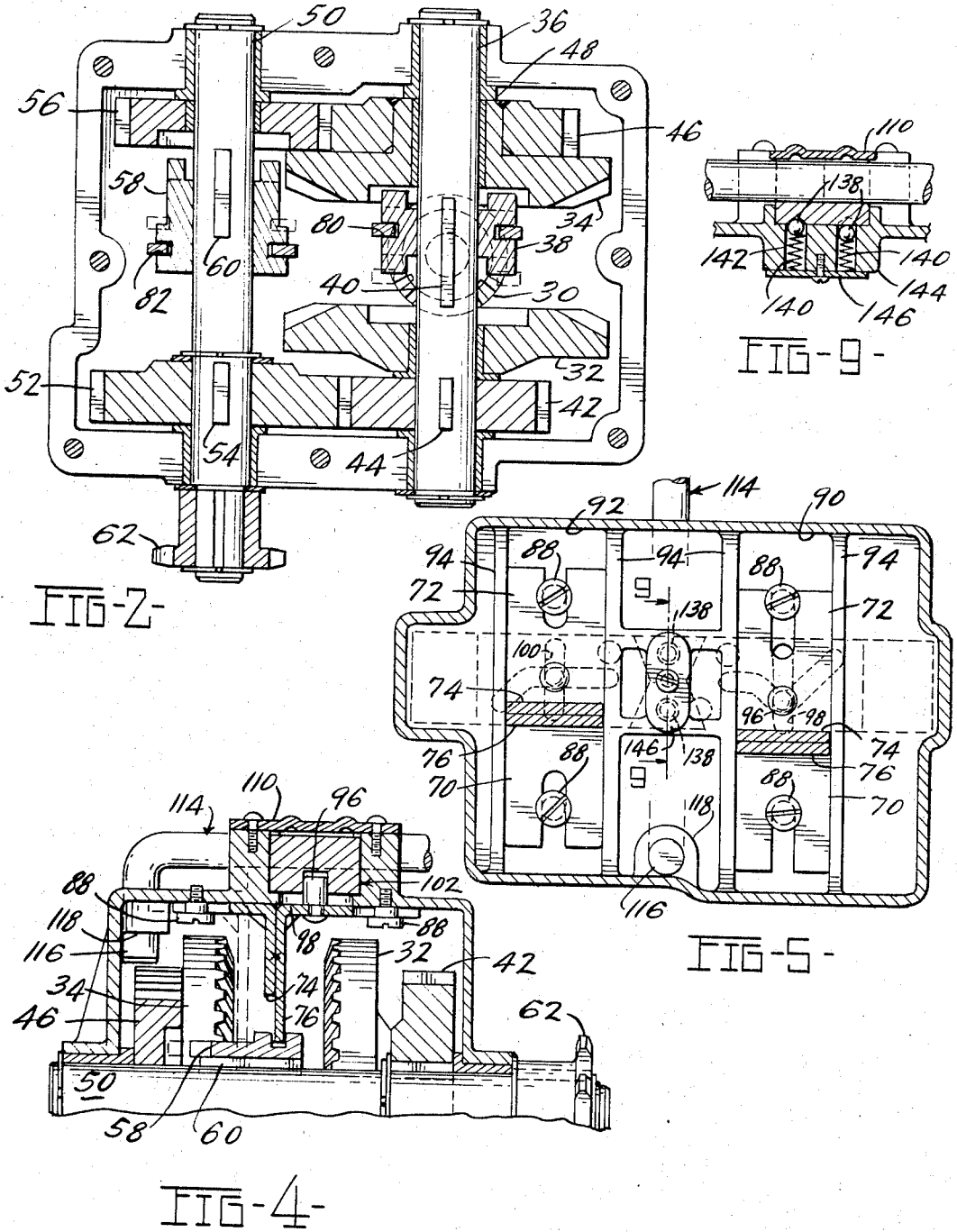

3,426,611
TRANSMISSION SHIFT MECHANISM
Hans Hauser, Fredericktown, Ohio, assignor to The J.B. Foundry Co., Fredericktown, Ohio, a corporation of Ohio
Filed July 10, 1967, Ser. No. 652,058
U.S. Cl. 74—475                                10 Claims
Int. Cl. F16h 5/06; G05j 9/14

ABSTRACT OF THE DISCLOSURE

A transmission shift includes a pair of shifter forks operated by a single cam member which is moved in a direction transverse to the movement of the forks by a shift lever. The mounting arrangement of the shift lever can be altered to enable the transmission to be used for either left-hand or right-hand operation. The transmission is particularly designed for use with small vehicles such as riding lawn mowers, tractors, or snow blowers.

---

This invention relates to an improved transmission shift mechanism and particularly to one utilizing a lineally movabel cam member for operating a plurality of shifter forks.

A wide variety of shift mechanisms have been proposed heretofore for transmissions. The present shift mechanism has at least two shifter forks located for parallel, lineal movement with a single cam member employed for operating both of the shifter forks, with the cam member moved in a transverse direction relative to the direction of movement of the forks. The cam member is moved by a shift lever pivotally mounted with respect to the transmission housing and engageable with the cam member to cause movement thereof. The pivoted position of the shift lever can be changed to adapt the shift lever for either left- or right-hand operation. The shift mechanism according to the invention is of reliable, simple, and maintenance-free design.

It is, therfore, a principal object of the invention to provide a shift mechanism for a transmisison having the advantages outlined above.

Many other objects and advantages of the invention will be apparent from the following detailed description of a preferred embodiment thereof, reference being made to the accompanying drawings, in which:

FIG. 1 is a top view of a transmission embodying shifting mechanism according to the invention, with parts broken away and with parts in section;

FIG. 2 is a view in horizontal cross section taken centrally through the transmission;

FIG. 3 is a view in vertical section taken along the line 3—3 of FIG. 1;

FIG. 4 is a transverse sectional view taken along the line 4—4 of FIG. 1;

FIG. 5 is a view in horizontal cross section, looking upwardly, taken along the line 5—5 of FIG. 3;

FIG. 6 is a detailed perspective view of a shifting dog employed in the transmission;

FIG. 7 is a view in perspective of a shifter fork of the shift mechanism;

FIG. 8 is a perspective view of a lineal cam member employed in the shift mechanism; and FIG. 9 is a detailed, fragmentary view in section taken along the line 9—9 of FIG. 5.

Referring to the drawings and particularly to FIGS. 1–4, a transmission embodying the invention is indicated at 12 and includes a housing having an upper part or half 14 and a lower part or half 16 which are connected by suitably spaced bolts 18. The lower half 16 of the housing has legs 20 (FIG. 3) by means of which the transmission can be mounted on a suitable vehicle frame, indicated at 22, by bolts 24.

The transmission gears and operation will now be discussed, even though the details thereof do not form a part of the invention, since their operation facilitates illustration and explanation of the shift mechanism and its advantages. A vertical drive shaft 26 extends through needle bearings 28 in the bottom of the housing half 16 and is connected to a beveled pinion gear 30 immediately inside the housing. The drive shaft can be connected through a belt and sheave arrangement, for example, to a motor located at either the front or rear of the vehicle. The gear 30 meshes with two bevel gears 32 and 34 (see FIG. 2) which are mounted on an intermediate shaft 36 for independent rotation thereon. A clutch dog 38 is keyed to the shaft by a key 40 between the bevel gears 32 and 34 and can be operated to selectively engage either of the gears 32 and 34. A spur gear 42 is mounted on one end of the shaft 36 and rotates therewith by a key 44. Another spur gear 46 is affixed to a hub 48 of the bevel gear 34.

An output shaft 50 is rotatably carried by the housing and spaced a predetermined distance from the intermediate shaft 36. The output shaft 50 has a spur gear 52 mounted for rotation thereon by means of a key 54 and has a second spur gear 56 independently rotatable thereon. A second dog 58 rotates with the shaft 50 through a key 60 and can be selectively engaged with the gear 56. A drive sprocket 62 or other suitable drive means is mounted on an extension of the shaft 50 outside the transmission housing.

Two speeds forward and one reverse are achieved with the transmission 12. When the dog 38 is moved into engagement with the bevel gear 34, a first speed is provided; when the dog 38 is engaged with the bevel gear 32, reverse is provided; and when the dog 58 is engaged with the spur gear 56, second speed is provided. For first speed, with the dog 38 and the bevel gear 34 engaged, the intermediate shaft 36 is rotated in a forward direction and rotates the spur gear 42. This gear engages the spur gear 52 which drives the shaft 50 in a forward direction at a first speed.

When the dog 38 engages the bevel gear 32, the shaft 36 is rotated in the opposite direction which then causes the spur gear 42 to rotate in the opposite direction and rotate the shaft 50 in reverse, although at the same speed as the first forward speed.

When the dog 38 is in neutral and the dog 58 engages the spur gear 56, the shaft 50 is driven through the spur gears 56 and 46 directly by the bevel gear 34 to rotate the shaft 50 at a second forward speed.

The shift mechanism embodying the invention includes shifter forks 64 as best shown in FIG. 7. The fork 64 can be madet of two L-shaped plate members 66 and 68 having co-planar legs 70 and 72 forming a slide plate and having second legs 74 and 76 which can be spot welded or otherwise suitably connected to form a shank with the leg 76 extending further downwardly to form a yoke 78 engaged with an annular groove 80 in the shifter dog 38 or an annular groove 82 in the shifter dog 58. The legs 70 and 72 have end notches 84 and 86 which receive mounting screws 88 (FIG. 5) which slidably support the shifter forks 64 from the top wall of the upper housing half 14 and specifically in grooves 90 and 92 formed by side edges 94 cast in the housing. The legs 72 of the shifter forks also have projections or cam followers 96 extending upwardly therefrom through slots 98 and 100 in the housing, which slots extend parallel to the grooves 90 and 92.

A cam member 102, shown in perspective in FIG. 8, is slidably mounted in a chamber 104 (FIG. 1) on top of the housing half 14, which chamber is defined by side walls 106 and end walls 108 integral with the housing top. A cover 110 completes the top of the chamber 104. The side walls 106 have long notches or openings 112 therein to receive a shift lever 114. The cam member 102 is of powdered metal or a plastic material such as nylon, which moves smoothly and quietly in the housing. When made of metal, the cam member preferably has plastic anti-friction pads 115 at end portions thereof.

The shift lever 114 has a down-turned end 116 (FIG. 4) which is received in an opening in a boss 118 to mount the lever 114 for horizontal pivotal movement with respect to the housing. The opposite end of the lever 114 is bent upwardly beyond the housing and carries a shift knob 120. An intermediate portion 122 (FIG. 1) of the shift lever 114 is received in a transverse notch 124 of the cam member 102, which notch has two truncated triangular portions which engage the intermediate portion 122 of the lever when in its extreme angular positions to limit maximum pivotal movement of the lever. The bottom surface of the cam member 102 has elongate grooves or openings 126 and 128 therein to receive the projections 96 of the shifter forks 64. The first groove 126 controls movement of the shifter fork in the housing groove 90, as shown in FIG. 5, while the second groove 128 controls movement of the shifter fork in the groove 92. As shown in FIG. 2, the first groove 126 controls movement of the dog 38 while the groove 128 controls movement of the dog 58.

As the shift lever moves from an extreme left position, as shown in dotted lines in FIG. 1, to an extreme right position, the dogs are moved in such a manner that the gears are shifted from reverse to neutral, to first forward speed, and, finally, to second forward speed. These positions are marked in FIG. 1. More specifically, the grooves 126 and 128 are designed so that when the lever 114 is in the left extremity, the dog 58 is in neutral and the dog 38 is engaged with the bevel gear 32. In the next position of the lever 114, the two dogs are in neutral and not engaged with any gear. When the lever 114 is in the third position, the dog 38 is engaged with the bevel gear 34 while the dog 58 remains in neutral. Finally, in the extreme right position of the lever 114, the dog 38 is moved back to neutral while the dog 58 is moved into engagement with the gear 56. Of course, the grooves 126 and 128 can be designed in numerous ways to achieve any desired movement of the shifter forks 64 and the dogs 38 and 58 during lineal movement of the cam member 102. In the specific position of the cam member 102 and the dogs 38 and 58 shown in the drawings, the dog 38 is engaged with the bevel gear 34 to move the output shaft 50 at the first speed forward.

As shown in FIG. 8, the cam member 102 has three recesses 130, 132, and 134 in alignment and an offset single recess 136 therein. As shown in FIG. 9, the recesses are engaged by spring-loaded detents 138 backed by springs 140 located in chambers 142 in a hub portion 144 of the upper housing half 14. The ends of the detent chambers 142 are closed by a cover 146. The detents cooperate with the four recesses to hold the cam member 102 in the desired positions. Thus, in the extreme left position of the lever 114, the recess 134 is engaged by the right-hand detent 138. As the lever moves to the next position, the recess 136 is engaged by the left-hand detent 138 to hold the cam member 102 in neutral. For this purpose, the detent 138 can have a slightly stronger spring or deeper detent impression to give the operator a more immediate "feel" of the neutral position. As the shift lever is moved further toward the right, the recess 132 engages the right-hand detent to hold the cam member 102 in the first forward speed position. Finally, when the shift lever 114 is in its extreme right position, the right-hand detent 138 engages the recess 130 to hold the cam member in the second forward speed position.

It will be seen from the above that the new shift mechanism provides a relatively simple and reliable design. Only the single cam member 102 is required to operate both of the shifter forks 64, which reduces the number of parts required. Further, the simplified operation of the cam member 102 through the shift lever 114 provides a maintenance-free mechanical operation.

The transmission 12 is designed so that the shift lever 114 extends transversely of the vehicle and can be located below a driver's seat so that the shift knob 120 extends outwardly to the side of the seat to be easily manipulated by the operator. While the transmission as shown is designed for right-hand operation, in some instances, it may be desired that the transmission be operated on the left side of the vehicle by the left hand of the operator. For this purpose, the mold for the upper housing half 14 can have a core insert so that instead of the lever opening being in the boss 118, it can be in a boss 148 (FIG. 1) with the lever 114 then pivoted on the opposite side of the cam member 102 and extending beyond the other side of the housing. In such an instance, the relative positions of the two forward speeds, reverse, and neutral are still the same with the second forward speed toward the front of the vehicle and reverse toward the rear.

I claim:

1. A shift mechanism for a transmission comprising a housing, at least two shifter forks mounted for parallel, lineal movement on the inside of a wall of said housing, said forks having cam followers extending upwardly therefrom through openings in the housing wall, a slidable cam member on the outside of the wall and guided for lineal movement transversely to the direction of movement of said shifter forks, said cam member having elongated openings therein to receive said shifter fork cam followers, and manually operable shift means engageable with said cam member for moving said cam member lineally to preselected positions.

2. A shift mechanism according to claim 1 wherein said manually operable means includes a transverse groove in said cam member, and a shift lever having an end pivotally connected to said housing and having an intermediate portion extending through said groove.

3. A shift mechanism according to claim 1 characterized by said cam member having plastic anti-friction pads at end portions thereof.

4. A shift mechanism according to claim 1 wherein said cam member has recesses in the bottom thereof at predetermined positions, and said housing carries a pair of spring-loaded detents between said shifter forks which are engageable with said cam member recesses to hold said cam member in preselected positions.

5. A shift mechanism for a transmission comprising a housing, at least two shifter forks mounted for lineal, independent movement on said housing, a slidable cam member mounted on said housing and guided for lineal movement which is transverse to the movement of the shifter forks, said cam member being engageable with both of said shifter forks to cause movement of same, said cam member having a notch at an intermediate portion thereof, a manually-operable shift lever having an end portion pivoted with respect to said housing and having intermediate portions spaced from said pivoted portion and engaged in said notch of said cam member whereby said shift lever can be pivotally moved to lineally move said cam member.

6. A shift mechanism according to claim 5 characterized by said cam member having a plurality of recesses in the lower surface thereof, said housing having detent means carried thereby and engageable in said recesses to hold said cam member in preselected positions, said detent means being located between said shifter forks.

7. A shift mechanism according to claim 5 characterized by said cam member having at least two grooves in the lower surface thereof of predetermined shape and said shifter forks have cam followers extending into said grooves to cause lineal movement of said shifter forks independently of one another as said cam member is moved.

8. A shift mechanism according to claim 5 wherein said notch is shaped symmetrically with respect to the center line of said cam member whereby said shift lever can be pivotally mounted on either side of said cam member for manipulation of said cam member.

9. A shift mechanism according to claim 5 wherein each of said shifter forks comprises an L-shaped plate member having co-planar legs forming a slide plate and having second legs affixed together to form a shank, with at least one of said legs extending beyond the shank to form a fork for engaging a clutch dog.

10. A shift mechanism according to claim 9 wherein said co-planar legs of said shifter fork have end slots extending longitudinally of said shifter fork, and fasteners extending through said slots and affixed in said housing for movably supporting said shifter fork.

References Cited

UNITED STATES PATENTS

| | | | |
|---|---|---|---|
| 2,577,019 | 12/1951 | Kesterton | 74—473 |
| 2,772,652 | 12/1956 | DuShane et al. | 74—473 X |
| 2,929,260 | 3/1960 | Hodkin | 74—473 |

MILTON KAUFMAN, *Primary Examiner.*

U.S. Cl. X.R.

74—337.5

UNITED STATES PATENT OFFICE

CERTIFICATE OF CORRECTION

Patent No. 3,426,611 February 11, 1969

Hans Hauser

It is certified that error appears in the above identified patent and that said Letters Patent are hereby corrected as shown below:

In the heading to the printed specification, lines 3 and 4, "The J. B. Foundry Co." should read -- The J. B. Foote Foundry Co. --; line 26, "movabel" should read -- movable --; line 42, "therfore" should read -- therefore --. Column 2, line 54, "madet" should read -- made --. Column 3, line 2, "198" should read -- 108 --.

Signed and sealed this 24th day of March 1970.

(SEAL)
Attest:

Edward M. Fletcher, Jr.            WILLIAM E. SCHUYLER, JR.
Attesting Officer                   Commissioner of Patents